(12) United States Patent
Delrue et al.

(10) Patent No.: US 12,226,047 B2
(45) Date of Patent: Feb. 18, 2025

(54) COOKING METHOD FOR A COOKING APPLIANCE INCLUDING A STIRRING MEANS, AND CORRESPONDING COOKING APPLIANCE

(71) Applicant: SEB S.A., Ecully (FR)

(72) Inventors: Olivier Delrue, Selongey (FR); François Letain, Marcilly-sur-Tille (FR)

(73) Assignee: SEB S.A. (FR)

( * ) Notice: Subject to any disclaimer, the term of this patent is extended or adjusted under 35 U.S.C. 154(b) by 394 days.

(21) Appl. No.: 15/748,483

(22) PCT Filed: Jul. 21, 2016

(86) PCT No.: PCT/FR2016/051906
§ 371 (c)(1),
(2) Date: Jan. 29, 2018

(87) PCT Pub. No.: WO2017/017356
PCT Pub. Date: Feb. 2, 2017

(65) Prior Publication Data
US 2018/0220842 A1    Aug. 9, 2018

(30) Foreign Application Priority Data
Jul. 30, 2015    (FR) ...................................... 1557335

(51) Int. Cl.
*A47J 36/32*    (2006.01)
*A23L 5/10*    (2016.01)
(Continued)

(52) U.S. Cl.
CPC ................. *A47J 36/32* (2013.01); *A23L 5/17* (2016.08); *A47J 27/004* (2013.01); *A47J 36/165* (2013.01);
(Continued)

(58) Field of Classification Search
CPC ........ A47J 36/32; A47J 36/321; A47J 36/165; A47J 27/004; A47J 37/047; A47J 37/0641; A23L 5/17
See application file for complete search history.

(56) References Cited

U.S. PATENT DOCUMENTS 5,074,201 A * 12/1991 Takeyama ............ A23C 20/025
                                                                   366/146
7,524,520 B2 * 4/2009 Ludwig .................... A23B 4/20
                                                                   426/233
(Continued)

FOREIGN PATENT DOCUMENTS

CA    2 805 606 A1    1/2012
CN    201332970 Y    10/2009
(Continued)

OTHER PUBLICATIONS

Google patents English translation EP 2248452; pp. 1-18 ; Bizard, Jean-Claude; Feb. 13, 2013. download date Jun. 3, 2020. (Year: 2013).*

(Continued)

*Primary Examiner* — Steven N Leff
(74) *Attorney, Agent, or Firm* — Lerner David LLP

(57) ABSTRACT

A cooking method and a cooking appliance allow the same cooking time to be used to cook different types of ingredients, without any action being required by the user.

9 Claims, 2 Drawing Sheets

(51) Int. Cl.
*A47J 27/00* (2006.01)
*A47J 36/16* (2006.01)
*A47J 37/04* (2006.01)
*A47J 37/06* (2006.01)

(52) U.S. Cl.
CPC ........... *A47J 36/321* (2018.08); *A47J 37/047* (2013.01); *A47J 37/0641* (2013.01); *A23V 2002/00* (2013.01)

(56) References Cited

U.S. PATENT DOCUMENTS

| | | | |
|---|---|---|---|
| 8,122,815 B2* | 2/2012 | Wolfe | A47J 36/165 99/348 |
| 2005/0037118 A1* | 2/2005 | Panaioli | A23B 7/0441 426/509 |
| 2013/0344204 A1* | 12/2013 | Goodson | B01F 15/00253 426/231 |

FOREIGN PATENT DOCUMENTS

| | | | | |
|---|---|---|---|---|
| DE | 20 2005 021931 U1 | 8/2011 | | |
| EP | 2248452 A1 * | 11/2010 | ............ | A47J 37/047 |
| FR | 3 004 630 A1 | 10/2014 | | |
| WO | WO 2006/000699 A2 | 1/2006 | | |
| WO | WO-2012007681 A2 * | 1/2012 | ............ | A47J 37/108 |
| WO | WO 2014/068225 A1 | 5/2014 | | |
| WO | WO 2014/125200 A1 | 8/2014 | | |

OTHER PUBLICATIONS

Google patents English translation WO2012007681; Bizard, Jean-Claude et al.; Feb. 14, 2013; pp. 1-7; download date Sep. 29, 2020. (Year: 2013).*
Hand Annotated Figure 1; WO2012007681; Bizard, Jean-Claude; Jan. 19, 2012; pp. 1.*
International Search Report as issued in International Patent Application No. PCT/FR2016/051906, dated Nov. 18, 2016.

* cited by examiner

COOKING METHOD FOR A COOKING APPLIANCE INCLUDING A STIRRING MEANS, AND CORRESPONDING COOKING APPLIANCE

CROSS-REFERENCE TO RELATED APPLICATIONS

This application is the U.S. National Stage of PCT/FR2016/051906, filed Jul. 21, 2016, which in turn claims priority to French patent application number 15537335 filed Jul. 30, 2015. The content of these applications are incorporated herein by reference in their entireties.

FIELD OF THE INVENTION

This invention concerns the technical field of cooking methods for electric cooking appliances comprising a stirring means arranged in a food holding means, as well as the corresponding cooking appliances.

This invention concerns in particular, but not exclusively, a cooking method for electric appliances for mixing and cooking food in pieces, such as French fries or chicken pieces, comprising a stirring means in a chamber arranged in case housing a hot air heating device, in which the stirring means and the chamber are designed to be put into motion with respect to each other, in order to mix and stir the food and the fat inside the chamber. The document WO 2006/000699 discloses such cooking appliances.

BACKGROUND OF THE INVENTION

The document FR 3004630 discloses a cooking method that uses a cooking appliance of the aforementioned type, comprising a stirring paddle rotationally driven in a container. One disadvantage encountered with this method is that it is suited to cooking only one type of ingredient at a particular cooking level. In fact, the method permits cooking breaded ingredients by controlling the appliance's set-point temperature as well as the stirring of the ingredient, in order not to damage the ingredients.

If one wishes to cook several ingredients at the same time and at different cooking levels, as is the case in an elaborate recipe, the ingredients must be cooked one after the other by adding them to the holding means as the cooking progresses. However, such cooking takes a long time, since it necessitates turning off the appliance at each step in a recipe in order to add the next ingredients, and then turning the appliance on again to continue the cooking once the new ingredients are placed within. In addition, the organoleptic results of the ingredients may be altered, since cooking is not uniform over time, in part because of the various manipulations.

BRIEF SUMMARY OF THE INVENTION

One purpose of this invention is to propose an improved cooking method permitting the cooking of multiple ingredients arranged together in the holding means, each at different cooking levels.

One purpose of this invention is also to propose a cooking method permitting faster and optimized cooking of multiple ingredients at different cooking levels.

One purpose of this invention is to propose a cooking method permitting the cooking of multiple ingredients arranged together at different cooking levels while preserving the organoleptic qualities of the ingredients.

One purpose of this invention is to propose a cooking appliance permitting rapid and optimized cooking of multiple ingredients arranged together at different cooking levels.

One purpose of this invention is to propose a cooking appliance permitting the cooking of multiple ingredients arranged together at different cooking levels while preserving the organoleptic qualities of the food.

These purposes are achieved with a cooking method for a cooking appliance comprising a holding means provided to hold ingredients, a stirring means arranged inside the holding means, at least one main heating means, at least one ventilation motor for generating a heating flow, the holding means and the stirring means being designed to be animated with a relative rotation at a certain speed, the appliance comprising at least one interface for control of the relative rotation, of the at least one main heating means, and of the at least one ventilation motor, characterized in that the cooking method includes at least the following steps:

an initial step in which at least one type of ingredient is arranged according to a specific arrangement in at least two separate cooking zones of the holding means, where at least one of the two zones is at least in part directly underneath the heating flow;

a first cooking step during which the relative rotation of the holding means and of the stirring means is neutralized, at least one main heating means is controlled in order to regulate the temperature at a first set-point value, and at least one ventilation motor is controlled in order to regulate the heating flow at a first circulation speed;

a second cooking step during which the relative rotation of the holding means and of the stirring means is active at a first speed of relative rotation of the holding means and of the stirring means, and at least one main heating means is controlled in order to regulate the temperature at a second set-point value, greater than or equal to the first, and at least one ventilation motor is controlled in order to regulate the heating flow at a second circulation speed.

In this manner, according to the cooking zones, the cooking of a first type of ingredient will proceed primarily during the first cooking step, and the cooking of a second type of ingredient will take place primarily during the second cooking step, at the same time as the cooking of the first type of ingredient is finalized during this second cooking step.

The effect of this cooking method is that types of ingredients with different cooking profiles may be cooked in the same overall cooking time and in the same appliance, so that the ingredients are all properly cooked by the end of the overall cooking time.

Advantageously, the second cooking step is repeated with a third set-point temperature, a third heating flow circulation speed, and a second speed of relative rotation of the holding means and of the stirring means.

The effect of being able to repeat the second cooking step permits more precise cooking of the ingredients that have been mixed, in order to obtain improved gustatory qualities.

Advantageously, the first set-point value is between 80° C. and 150° C.

The effect of having a set-point value between these values is to be able to cook food that is fragile during cooking.

Advantageously, the second set-point value is between 100° C. and 200° C.

The effect of having a set-point value between these values is to be able to cook foods that are not fragile.

Advantageously, the total cooking time of the two cooking steps corresponds to the cooking time selected by a user.

In this manner, the cooking of different types of ingredients is finished at the end of the cooking time selected by the user.

Advantageously, the first or the second speed of relative rotation of the holding means and of the stirring means is between 0 and 10 rpm.

This permits different types of ingredients to be mixed together during the second cooking step and permits all ingredients to be cooked.

Advantageously, the first flow circulation speed is between 10 and 25 m/s.

Such a flow circulation speed permits a good heat exchange with the ingredients.

Advantageously, the second flow circulation value is between 10 and 25 m/s.

Such a flow circulation speed permits a good heat exchange with the ingredients.

Advantageously, the cooking appliance comprises a communication module which is configured to receive one or more control signals from a terminal (TER), said signal or signals including at least one piece of data on the first and/or the second temperature set-point value, and/or a piece of data on the relative rotation of the holding means and of the stirring means, and/or a piece of data on the first and second flow circulation speed, and/or cooking time data.

The effect obtained by remotely controlling the appliance from a terminal is to be able to reduce the costs of the electrical means to be implemented in the appliance, and also to increase the user's autonomy.

These purposes are also achieved with a computer program product comprising code instructions arranged to implement the steps of a method stated above, when the said program is executed on a control interface of a cooking appliance.

These purposes are also achieved with a cooking appliance comprising a control interface having in memory the code instructions of a computer program product as described previously and arranged to execute such a computer program product.

BRIEF DESCRIPTION OF THE DRAWINGS

Other advantages and particularities of this invention will appear in the description of the embodiments provided as a non-restrictive example and illustrated in the attached drawings, where.

DETAILED DESCRIPTION

Figure 1:
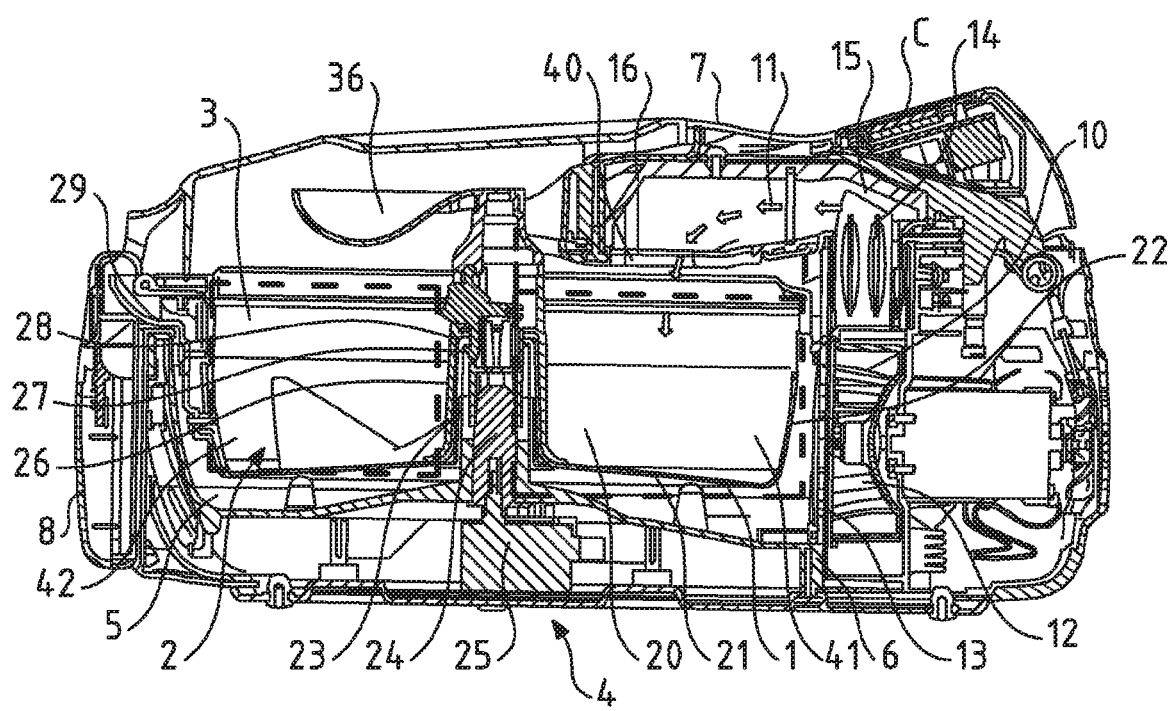
FIG. 1 is a longitudinal cross-section view of a first embodiment example of a cooking appliance to implement the method according to the invention.

The cooking appliance represented in FIG. 1 comprises a holding means 1 provided to hold the ingredients, a stirring means 2 arranged inside the holding means 1. The holding means 1 has a top opening 3. The holding means 1 and the stirring means 2 are designed to be animated by a relative rotation with respect to each other.

More specifically, the holding means 1 is arranged in a case 4. The case 4 defines a housing 5 in which the holding means 1 is arranged. The case 4 comprises a body 6 topped with a lid 7.

The cooking appliance comprises at least one main heating means 10. As represented in FIG. 1, the main heating means 10 generates a heating flow 11 entering the holding means 1 through the top opening 3.

More specifically, the cooking appliance comprises a ventilator 12 provided to aspirate the air in the housing 5 through an air intake 13 and to propel the air over a heating element 14 arranged in a duct 15. The duct 15 is extended by an exhaust nozzle 16 which discharges into the housing 5 at an outlet 40. In the first embodiment, the outlet 40 of the exhaust nozzle 16 is positioned above the holding means 1, and it is configured such that the air primarily discharges to a first zone 41 of the holding means 1 positioned directly underneath this outlet 40. This has the effect that the ingredients positioned below the outlet 40 and in the first zone 41 are subject to a significant heat gain and thus cook quickly.

In contrast, the holding means 1 comprises a second zone 42 which is off center from the outlet 40 of the exhaust nozzle 16, that is, which is not positioned directly underneath the latter and where the ingredients are thus not directly exposed to the hot air flow coming out of it. The ingredients positioned in this second zone 42 thus in general cook less quickly than those positioned in the first zone 41, since the holding means 1 and the stirring means 2 are not animated by a relative rotation with respect to each other.

Figure 2:
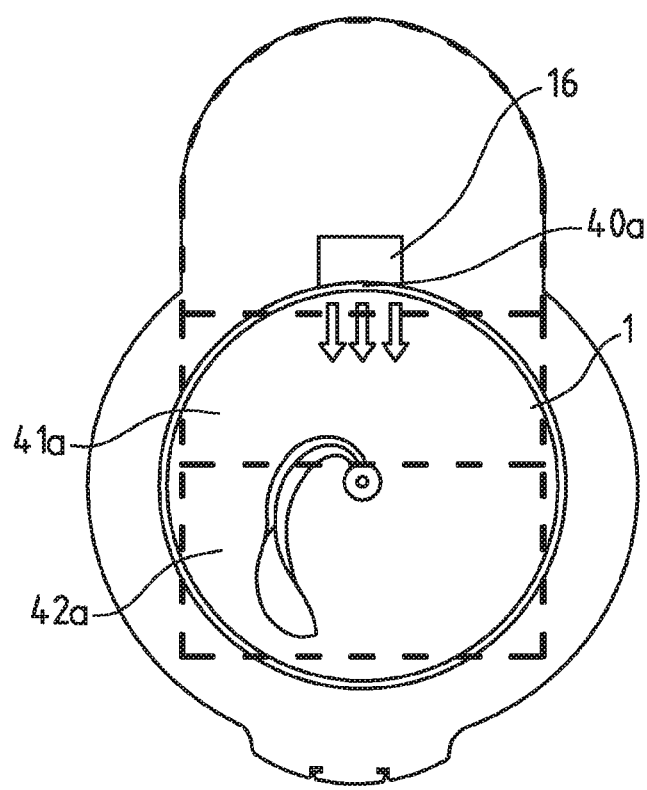
FIG. 2 is a top view of a second embodiment example of a cooking appliance to implement the method according to the invention.

In the second variant represented in FIG. 2, the cooking appliance is equivalent to the one represented in FIG. 1, except that the outlet 40a of the exhaust nozzle 16 is positioned on the side of the holding means. However, the outlet 40a of the exhaust nozzle 16 is configured such that the air primarily strikes a first zone 41a of the holding means 1 positioned directly next to this outlet 40a. This has the effect that the ingredients positioned at the first zone 41a next to the outlet 40a are subject to a significant heat gain and thus cook more quickly. Still in the variant illustrated in FIG. 2, the holding means includes a second zone 42a which is positioned opposite the outlet 40a of the exhaust nozzle 16. In this case, the ingredients are thus not directly exposed to the hot air flow and thus in general cook less quickly than those positioned in the first zone 41a since the holding means 1 and the stirring means 2 are not animated by a relative rotation with respect to each other.

More specifically, the holding means 1 is formed of a chamber 20 comprising a bottom 21 and a side wall 22. According to the embodiment variant in FIG. 1, the bottom 21 slopes down toward the side wall 22. The chamber 20 has a central opening 23 provided for the passage of a drive shaft 24 rotationally driven by a motor 25. A shaft 26 is mounted on the central opening 23. The stirring means 2 is mounted on the drive shaft 24. The holding means 2 has a hooking member 27 provided to engage with a holding member 28 arranged in the shaft 26. The chamber 20 is advantageously made of metallic material, preferably coated metallic material or stainless steel. The holding means 1 comprises a support 29 fixed to the chamber 20. The holding means 1 has a handle 8. The handle 8 is, for example, mounted articulated on the support 29.

The holding means 1 is mounted detachably with respect to the case 4.

According to the invention, the stirring means is rotated by a motor that is mechanically connected to the drive shaft 24.

The motor is controlled by an electronic control interface C ensuring activation or neutralization of the motor and thus the rotation of the stirring means 2. The mean rotation speed of the stirring means 2 is between 0 and 10 rpm.

Likewise, the control interface C supplies power to the heating means 10 of the appliance. In particular, the electronic control interface is conformed to ensure the operation of the appliance at two temperature levels at least, and it makes it possible in particular to turn on the appliance, and choose, modify or cancel a pre-programmed cooking mode in the electronic control interface.

The appliance also comprises a computer program product which includes code instructions. These code instructions are in memory in the control interface and they are arranged to implement the steps of the method that will be described in detail below.

The computer program is executed by the control interface of the cooking appliance.

Figure 3:
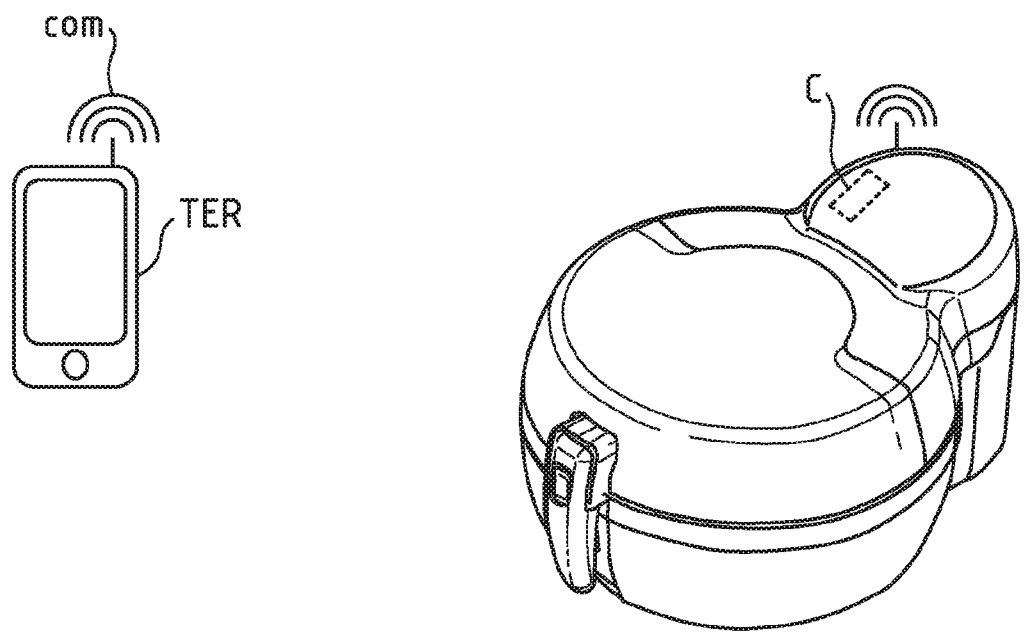
FIG. 3 is a diagram illustrating the communication between the cooking appliance and a remote terminal according to the two embodiments.

As show in FIG. 3, the cooking appliance may comprise a communication module which is connected to the control interface. This communication module permits receiving control signals or information from a device or remote terminal (TER) such as a computer or Smartphone. Communication between these devices may be achieved using any known communication protocol (com), including WIFI, Bluetooth® or radio frequency.

The control signal or signals may be control instructions that include a set of data necessary for implementation of the method according to the invention. The data transmitted may concern, in particular, the set-point temperature, the relative rotation of the holding means 1 and of the stirring means 2, as well as the rotation speed, the flow circulation speed, or the time associated with the different steps in the method, or operations that the cooking appliance has to perform during the steps of the method.

As a variant, other types of heating means 10 may be envisioned, in particular a radiant heating means generating a radiating heating flow 11 entering the holding means 1 through the top opening 3, or a heating means arranged in or below the holding means 1. If desired, the heating means may be integral with the holding means 1.

As a variant, the stirring means 2 is not necessarily rotationally driven in the holding means 1. In particular, the holding means may be mounted rotationally driven in a case, if desired.

As a variant, the holding means 1 is not necessarily formed of a chamber. The holding means preferably has a bottom and a side wall. The holding means may in particular be formed of a perforated basket.

To better understand the method according to the invention, the functioning and use of the appliance are described in detail below.

According to the invention, the electronic control interface C permits implementing a particular cooking method permitting simultaneous cooking of different ingredients, with different cooking levels according to each ingredient. The method further permits preserving the organoleptic qualities of the different ingredients.

Figure 4:
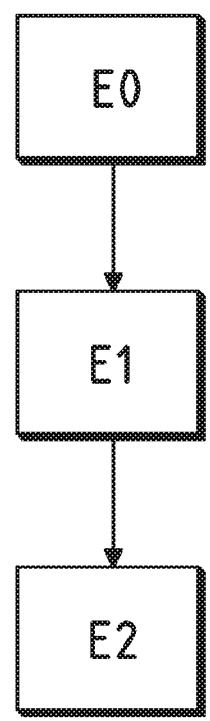
FIG. 4 is a flowchart presenting the steps of a cooking method of a cooking appliance according to the two embodiments.

In reference to FIG. 4, the cooking method includes for this three main steps. An initial step (E0) of the method consists of positioning the different ingredients in the defined zone(s) of the holding means. In this manner, certain ingredients will be at least in part directly underneath the heating flow, which will have the effect that they will be subject to a greater heat gain than the other ingredients positioned in the other zone during the first cooking step (E1).

This first step (E1) consists, during a defined period, of neutralizing the relative rotation of the holding means 1 and of the stirring means 2, maintaining the temperature inside the appliance at a first temperature value, and controlling the heating means so as to regulate the heating flow at a first circulation speed.

According to the first step, because of the non-rotation of the stirring means 2, only certain ingredients are directly exposed to the heating flow: those which are positioned in the zone of the holding means located below or next to the outlet of the nozzle. In this step, the speed of the heating flow is controlled. The fact of being able to control the speed of this flow permits controlling the speed and kinetics of cooking of these foods so as to cook them while preserving their organoleptic qualities.

This is very interesting when the holding means contains ingredients which require very different cooking times, as we will see below. After this first step, the foods requiring the longest cooking time, and positioned in the first cooking zone, are in part already cooked, and their cooking must be finished while cooking the foods positioned in the second zone of the holding means. This operation is performed during the second cooking step (E2).

In fact, the second step of the method consists of simultaneously activating the relative rotation of the holding means 1 and of the stirring means 2, maintaining the temperature inside the appliance at a second temperature value greater than or equal to the temperature of the first step, and controlling the cooking means so as to regulate the heating flow at a second circulation speed.

The second step corresponds to the phase of cooking the different ingredients together. Stirring the food in the container permits distinguishing the different ingredients, and the cooking proceeds in the same way for all ingredients that are mixed in this step. The flow circulation speed chosen for this second step permits refining the cooking of the ingredients already cooked in the first zone and completely cooking the ingredients in the second zone.

The relative rotation of the stirring means and of the holding means may be continuous or intermittent.

According to one embodiment variant, the temperature of the first step is between 80° C. and 150° C. The temperature of the second step is between 100° C. and 200° C.

The choice of temperatures depends in particular on the types of ingredients to be cooked.

The invention is used in the manner that will be described below:

The user places the holding means 1 in the housing 5 of the case 4, mounts the stirring means 2 in the holding means 1, places the ingredients in the holding means 1 and, if desired, adds fat or oil using a spoon 36.

According to the recipe desired, the user places the ingredients according to a particular arrangement in at least the two separate cooking zones of the holding means, such that at least one ingredient is at least in part directly underneath the heating flow. As a general rule, the ingredients that require the longest cooking time are placed in the zone located directly above or next to the outlet of the exhaust nozzle.

When the appliance is turned on, the user selects the appropriate cooking mode and chooses the cooking time via the control interface. According to another variant, a predetermined duration may be displayed and then modified by the user according to the food and/or the recipe. For example, the total duration of the cooking cycle is between 10 and 50 minutes. According to yet another variant, the cooking mode and the cooking time are transferred from the remote device (TER) to the cooking appliance.

When the cooking cycle begins, the first step of the method according to the invention is triggered by the control interface. The latter controls the heating means 10 in order to generate the heating flow 11 entering the holding means 1 through the top opening 3 and through the exhaust nozzle. In addition, the motor 25 rotationally driving the stirring means 2 in the holding means 1 is not activated. The temperature control at the first temperature value is ensured, for example, via a NTC (negative temperature coefficient) sensor. The heating means is also activated so as to regulate the heating flow at a first air circulation speed. When the duration of the first step has elapsed, the second step of the method according to the invention begins.

According to this second step, the heating means is kept active. The temperature control is modified and increased to a second value. Simultaneously, the motor 25 rotationally driving the stirring means 2 in the holding means 1 is activated by the electronic control interface C, and the heating means is now controlled such that the heating flow has a second air circulation speed.

The stirring means 2 contributes to mixing the ingredients with each other so as to make the recipe uniform.

When the total duration of the cooking cycle has elapsed, the heating means and the motor are deactivated.

The user may remove the holding means 1 from the case 4 using the handle 8.

This invention is in no way limited to the examples described, but encompasses many modifications in the context of the claims.

The invention claimed is:

1. A cooking method for a cooking appliance comprising a single holding means provided to hold ingredients, a stirring means arranged inside the single holding means, at least one main heating means, at least one ventilator powered by a motor for generating a heating flow, the single holding means and the stirring means being designed to be animated with a relative rotation at a certain speed, the appliance comprising at least one interface for control of the relative rotation, of the at least one main heating means, and of the at least one ventilator powered by the motor, the cooking method comprising:

an initial step in which at least first type of ingredient is arranged according to a specific arrangement in one of at least two separate cooking zones of the single holding means and, simultaneously at least second type of ingredient is arranged according to a specific arrangement in a second one of the at least two separate cooking zones, where the one of the at least two separate cooking zones is at least in part but mainly directly underneath the heating flow;

a first cooking step during which the relative rotation of the single holding means and of the stirring means is neutralized, the at least one main heating means is controlled in order to regulate the temperature at a first set-point value, and the at least one ventilator powered by the motor is controlled in order to regulate the heating flow at a first circulation speed, such that the at least first type of ingredient arranged in the one of the at least two separate cooking zones at least in part but mainly directly underneath the heating flow is subject to a greater heat gain than the at least second type of ingredient arranged in the second one of the at least two separate cooking zones; and a second cooking step during which the relative rotation of the single holding means and of the stirring means is active at a first speed of relative rotation of the single holding means and of the stirring means such that the at least first and second types of ingredients arranged in the one and the second one of the at least two separate cooking zones are mixed, and the at least one main heating means is controlled in order to regulate the temperature at a second set-point value, greater than or equal to the first set-point value, and the at least one ventilator powered by the motor is controlled in order to regulate the heating flow at a second circulation speed.

2. The cooking method according to claim 1, wherein the second cooking step is repeated with a third set-point temperature, a third heating flow circulation speed, and a second speed of relative rotation of the single holding means and of the stirring means.

3. The cooking method according to claim 1, wherein the first set-point value is between 80° C. and 150° C.

4. The cooking method according to claim 1, wherein the second set-point value is between 100° C. and 200° C.

5. The cooking method according to claim 1, wherein a total cooking time of the first and second cooking steps corresponds to a cooking time selected by a user.

6. The cooking method according to claim 1, wherein the first or the second speed of relative rotation of the single holding means and of the stirring means is between 0 and 10 rpm.

7. The cooking method according to claim 1, wherein the first flow circulation speed is between 10 and 25 m/s.

8. The cooking method according to claim 1, wherein the second flow circulation speed is between 10 and 25 m/s.

9. The cooking method according to claim 1, wherein the cooking appliance comprises a communication module which is configured to receive one or more control signals from a terminal, said one or more control signals including at least one piece of data on the first and/or the second temperature set-point value, and/or a piece of data on the relative rotation of the single holding means and of the stirring means, and/or a piece of data on the first and second flow circulation speed, and/or cooking time data.

* * * * *